United States Patent
Aoyagi et al.

(10) Patent No.: US 7,362,686 B1
(45) Date of Patent: Apr. 22, 2008

(54) FILM MEASUREMENT USING REFLECTANCE COMPUTATION

(75) Inventors: Paul Aoyagi, Sunnyvale, CA (US); Philip D. Flanner, III, Union City, CA (US); Leonid Poslavsky, Belmont, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 751 days.

(21) Appl. No.: 11/000,771

(22) Filed: Dec. 1, 2004

(51) Int. Cl.
*G11B 7/00* (2006.01)
*B32B 9/00* (2006.01)

(52) U.S. Cl. .................. 369/100; 428/446; 356/601

(58) Field of Classification Search .............. None
See application file for complete search history.

(56) References Cited

U.S. PATENT DOCUMENTS

| | | | |
|---|---|---|---|
| 6,836,338 B2 * | 12/2004 | Opsal et al. | 356/601 |
| 6,898,537 B1 * | 5/2005 | McGahan | 702/76 |
| 2002/0090521 A1 * | 7/2002 | Nakajima et al. | 428/446 |

OTHER PUBLICATIONS

Li, *Formulation and Comparison of Two Recursive Matrix Algorithms for Modeling Layered Diffraction Gratings*, J. Opt. Soc. Am., vol. 13, No. 5, pp. 1024-1035 (1996).
Moharam et al., *Formulation for Stable and Efficient Implementation of the Rigorous Coupled-Wave Analysis of Binary Gratings*, J. Opt. Soc. Am., vol. 12, No. 5, pp. 1068-1076 (1995).

* cited by examiner

*Primary Examiner*—Muhammad Edun
(74) *Attorney, Agent, or Firm*—Luedeka, Neely & Graham, P.C.

(57) ABSTRACT

A method of determining actual properties of layered media. An incident beam of light is directed towards the layered media, such that the incident beam of light is reflected from the layered media as a reflected beam of light. The actual properties of the reflected beam of light are measured, and properties of the layered media are estimated. A mathematical model of the layered media is solved with the estimated properties of the layered media to yield theoretical properties of the reflected beam of light. The mathematical model is solved using a diagonal T matrix algorithm. The theoretical properties of the reflected beam of light are compared to the actual properties of the reflected beam of light to yield a cost function. The estimated properties of the layered media are iteratively adjusted and the mathematical model is iteratively solved until the cost function is within a desired tolerance. The estimated properties of the layered media are reported as the actual properties of the layered media.

20 Claims, 1 Drawing Sheet

FILM MEASUREMENT USING REFLECTANCE COMPUTATION

FIELD

This invention relates to the field of film measurement. More particularly, this invention relates to a system for improving the speed and accuracy of multi layered film stack thickness measurement and other property measurement, such as in the integrated circuit fabrication industry.

BACKGROUND

As used herein, the term "integrated circuits" generally refers to monolithic semiconducting devices, such as those formed of group IV materials like silicon or germanium or mixtures thereof, or group III-V compounds such as gallium arsenide. The term "integrated circuits" includes all known configurations of such devices, such as memory and logic, and all designs of such devices, such as CMOS and bipolar.

Integrated circuits are formed of many layers of different materials, which layers are patterned so as to form desired structures that interact with one another according to predetermined designs. Thus, it is of vital importance that many of these layers be formed to very exacting tolerances, such as in their shape, thickness, and composition. If the various structures so formed during the integrated circuit fabrication process are not precisely formed, then the integrated circuit tends to not function in the intended manner, and may not function at all.

Because the layers of which integrated circuits are formed are so thin and patterned to be so small, they cannot be inspected without the aid of instrumentation. The precision of the instrumentation used is, therefore, vital to the successful production of integrated circuits. Thus, any improvement that can be made in the accuracy of such instrumentation is a boon to the integrated circuit fabrication industry. In addition, any improvement in the speed at which such instrumentation can take its readings is also of benefit to the industry, as such speed enhancements tend to reduce the production bottlenecks at inspection steps, or alternately allow for the inspection of a greater number of integrated circuits at such inspection steps.

Spectral ellipsometers and dual beam spectrophotometers are typically used to measure properties such as thickness and refractive index of individual layers within a multilayered film stack. Such instruments work by directing one or more beams of light toward the surface of the film stack, and then sensing the properties of the light as it is variously reflected off of the different surfaces of the individual layers within the film stack. By adjusting the properties of the incident beam of light, and detecting the associated changes in the reflected beam of light, the properties of the film stack, such as the materials of which the various layers are formed and thicknesses to which they are formed, can be determined.

This film measurement process can be broken down into two basic steps, being 1) the measurement of the properties of the reflected light beam, and 2) the mathematical fitting of computed reflectance property values based on some theoretical model, such as Rigorous Coupled Wave Analysis, to the measured results attained in step 1. Step 2 typically consists of the iterated steps of computing one or more theoretical value by plugging estimates of the film stack parameters, such as thickness and refractive index, into the model film stack equations, comparing the theoretical values obtained to the actual measured property values of the reflected beam of light, and if the theoretical values and the measured values do not agree to within a desired tolerance, then adjusting the estimated film stack parameters and recomputing the theoretical values.

This process is performed again and again, each time making some adjustment to the estimated film stack parameters that are fed into the model, until the theoretical values computed by the model agree with the actual measured values within the desired precision limits. When this agreement is attained, then there is some confidence that the estimated film stack parameters that were used to produce the theoretical values are very nearly the same as the actual film stack parameters.

For many film stacks, the step of iterative computing as described above consumes by far the most time during the process. For some film stacks, such as those film stacks that contain patterned lines, this iterative steps becomes extremely complex, because of the tremendous overhead of computing and tracking reflections at multiple diffracting angles.

The reflectance equations that are derived for film stacks that generate multiple plane waves traveling at different angles are typically-formulated using at least one of the S matrix algorithm or the R matrix algorithm, as understood by those with skill in the art. However, these algorithms are computationally burdensome, and require a longer than desirable period of time—and greater than desirable computational resources—to solve. Another well-known alternate formulation for computing the reflectance is the T matrix algorithm. Although this algorithm is more computationally efficient, it is highly susceptible to computational overflow error and is therefore seldom used in practical applications.

What is needed, therefore, is a method of spectral film stack measurement that tends to reduce at least some of the problems described above.

SUMMARY

The above and other needs are met by a method of determining actual properties of layered media. An incident beam of light is directed towards the layered media, such that the incident beam of light is reflected from the layered media as a reflected beam of light. The actual properties of the reflected beam of light are measured, and properties of the layered media are estimated. A mathematical model of the layered media is solved with the estimated properties of the layered media to yield theoretical properties of the reflected beam of light. The mathematical model is solved using a diagonal T matrix algorithm. The theoretical properties of the reflected beam of light are compared to the actual properties of the reflected beam of light to yield a cost function. The estimated properties of the layered media are iteratively adjusted and the mathematical model is iteratively solved until the cost function is within a desired tolerance. The estimated properties of the layered media are reported as the actual properties of the layered media.

The embodiments of the present invention differ from the prior methods in that the S or R matrix algorithms are replaced or augmented with the more efficient diagonal T matrix algorithm—as described more completely herein—to compute the layered media reflectance. In this manner, the computational time and memory requirements are reduced. In particular, for a typical one or two layer thin film measurement over a grating, the diagonal T matrix algorithm reduces the total computation time by about two-thirds, in comparison to the S and R matrices. In this manner, the computational time and memory requirements are reduced by substantially eliminating all full matrix multiplications as well as full matrix caching for the isotropic or uniaxial layers above the top grating layer.

The computational savings that are realized by using the diagonal T matrix are considerable. Full matrix operations require $N^3$ floating point operations, whereas diagonal matrix operations require only N floating point operations, where N equals the matrix dimension. Thus, the diagonal T matrix algorithm is considerably more efficient than the S matrix and the R matrix algorithms. For thin-film measurements on patterned metal the advantages of using the diagonal T matrix is of particular significance, because most of the analysis time is spent computing or regressing reflectance of the isotropic or uniaxial films above the patterned metal layers.

In various embodiments, the method is implemented in an ellipsometer. The layered media may be layers of more than one material, or more than one layer, or is a film stack on a semiconducting substrate, and preferably includes a grating layer. The actual properties of the layered media preferably include at least one of layer thickness and layer refractive index. In some embodiments the mathematical model is a reflectance model that is derived using rigorous coupled wave analysis. Preferably, the diagonal T matrix algorithm is used to compute a reflectance or related parameter such as the ratio of total electric and magnetic fields of the layered media. The method may also be implemented in a scatterometer. In various embodiments, the diagonal T matrix is used in combination with at least one of an S matrix algorithm and an R matrix algorithm. This invention is preferably implemented as an add-in to existing instrument software.

According to another aspect of the invention there is described a method of determining a reflectance of a layered media by iteratively solving a mathematical model of the layered media with estimated properties of the layered media, where the mathematical model is solved using a diagonal T matrix algorithm.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
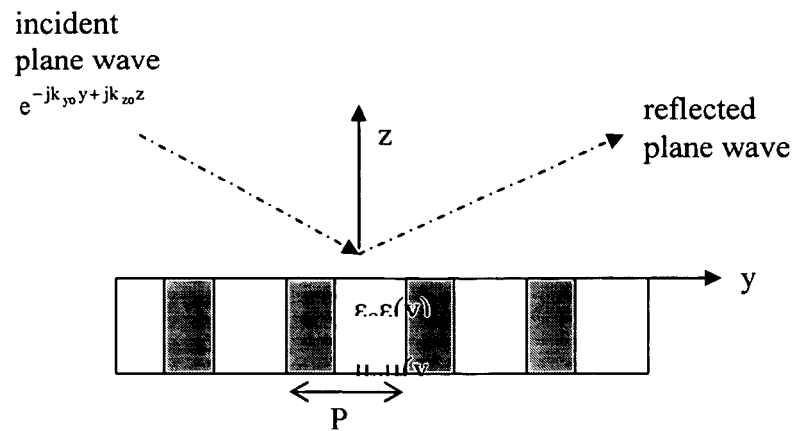
FIG. 1 is a film stack coordinate system for a grating layer.

Ellipsometry methods generally begin by computing the cost or error function, for example:

$$C(R_{meas}(\lambda), R_{theory}(\lambda, P))$$

Where $R_{meas}$ is a function of wavelength ($\lambda$), and $R_{theory}$ is a multivariable function in $\lambda$ and P, and where:

$$P=(P_0, P_1, P_2, \ldots P_N).$$

Minimize equation 1 with respect to P. There are two ways to do this. One method requires derivatives and the other does not. In general, methods that require derivatives converge faster than those that do not use derivatives and are, for that reason, preferable. The derivative approach requires finding values that make the first derivatives equal to zero, for example, $$\frac{\partial C}{\partial P_n} = \sum_{m=0}^{M} \left(\frac{\partial C}{\partial R_{theory}}\right)\left(\frac{\partial R_{theory}}{\partial P_n}\right) = 0 \qquad 2$$

Where:

n=0, 1, . . . N.

Equation 2 is N equations in N unknowns, because there are N derivatives corresponding to N parameters which must be set to zero. To solve equation 2 using linear algebra theory, it is generally necessary to approximate $R_{theory}$ with its linear approximation $R'_{theory}$ using a Taylor series expansion, for example, $$R_{theory}(P) \approx R'_{theory}(P) = R_{theory}(P_o) + \sum_{n=0}^{N} \frac{\partial R_{theory}}{\partial P_n}\bigg|_{P=P_o} \qquad 3$$

$$(P_n - P_{no})$$

Where:

$P=(P_{00}, P_{10} \ldots P_{N0})$

As alluded to above, one novel aspect of the various embodiments according to the present invention lies in the regression algorithm and, in particular, the derivatives used therein. $R_{theory}$ derivatives in equations 2 and 3 can be computed numerically or analytically. Preferably, these derivatives are computed analytically so as to not only improve the accuracy of the method, but also to remove the nonconvergence problems that are associated with numerical derivatives. Moreover, analytical derivatives tend to be more amenable to computational efficiency improvements associated with the caching of intermediate variables. Thus, embodiments of the present invention tend to be both faster than numerical methods and more accurate than numerical methods.

In practice, analytical derivatives are not always derivable due to the mathematical complexity of $R_{theory}$. An important case in point is the $R_{theory}$ derivatives based on the Rigorous Coupled Wave Analysis. The Rigorous Coupled Wave Analysis model is one of the most if not the most widely used physical model used in ellipsometry and scatterometry measurements over patterned inhomogeneous media. The expressions for the derivatives of $R_{theory}$, however, are not readily computed because of the numerical eigenvalue/eigenvector computations involved. One of the novelties in the various embodiments according to the present invention is that analytic expressions for $R_{theory}$ derivatives are derived based on the Rigorous Coupled Wave Analysis. A generalized expression of the equation is given by:

$$\frac{\partial C(R_{meas}(\lambda_m), R_{theory}(\lambda_m, P))}{\partial P_n} = \sum_{m=0}^{M}\left(\frac{\partial C}{\partial R_{theory}}\right)\left(\frac{\partial R_{theory}(\lambda_m, P)}{\partial P_n}\right) = 0 \qquad 4$$

where C is the cost function, $R_{theory}$ is the theoretical reflectance, $R_{meas}$ is the measured reflectance, $P_n$ is a variable of the theoretical reflectance model (i.e. film stack parameters), $\lambda_m$ is the $m^{th}$ wavelength, m is the integer index, M is the total number of wavelength values, and $\sigma_m$ is the measurement uncertainty at $\lambda_m$.

The first step in the process to produce this analytic expression is to derive governing partial differential equations for a TE (E field parallel to the grating grooves) and TM plane (E field perpendicular to the grating grooves) wave incident on the planar grating shown in FIG. 1. It is noted that the discussions provided herein assume that the reader is generally familiar with the art of ellipsometry, and thus most terms are not specifically defined herein. However, the basic equations, variables, and methods are known to those with skill in the art.

Rigorous Coupled Wave Analysis Formulation

The TE case is defined by $(E_x, H_y, H_z) \neq 0$, and where all other field components are zero. E and H are the electric and magnetic fields, respectively, and is preferably solved using Maxwell's equations. For the TE case the equations simplify to:

$$j\omega\varepsilon_o\varepsilon(y)E_x = \frac{\partial H_z}{\partial y} - \frac{\partial H_y}{\partial z} \quad (5)$$

$$-j\omega\mu_o\mu(y)H_y = \frac{\partial E_x}{\partial z}; \quad j\omega\mu_o\mu_z(y)k_o^2 H_z = \frac{\partial E_x}{\partial y} \quad (6)$$

Where $\varepsilon$=relative dielectric permittivity, $\mu$=relative magnetic permeability in the (x, y) direction, $\mu_z$=relative magnetic permeability in the z direction, and $\varepsilon_o$ and $\mu_o$=dielectric permittivity and magnetic permeability of free space, respectively.

Because the grating structure is periodic in the y axis, the electromagnetic fields and the grating profile is preferably expresses as a Fourier series, for example:

$$E_x = \sum_{n=-N}^{N} e_{x,n}(x,z) e^{j\left(\frac{2\pi n}{P} - k_{yo}\right)y} \quad (7)$$

$$H_y = \sum_{n=-N}^{N} h_{y,n}(x,z) e^{j\left(\frac{2\pi n}{P} - k_{yo}\right)y}; \quad H_z = \sum_{n=-N}^{N} h_{z,n}(x,z) e^{j\left(\frac{2\pi n}{P} - k_{yo}\right)y} \quad (8)$$

$$\varepsilon = \sum_{n=-N}^{N} \varepsilon_n e^{-j\frac{2\pi n}{P}y}, \mu = \sum_{n=-N}^{N} \mu_n e^{-j\frac{2\pi n}{P}y}, \mu_z = \sum_{n=-N}^{N} \mu_{z,n} e^{-j\frac{2\pi n}{P}y} \quad (9)$$

From orthogonality, each Fourier harmonic preferably independently satisfies Maxwell's equations. Therefore, Maxwell's equations are preferably expressed in the following matrix form:

$$j\omega\varepsilon_o E e_x = \frac{\partial h_z}{\partial y} - \frac{\partial h_y}{\partial z} \quad (10)$$

$$-j\omega\mu_o M h_y = \frac{\partial e_x}{\partial z}; \quad j\omega\mu_o k_o^2 M_z h_z = \frac{\partial e_x}{\partial y} \quad (11)$$

Where:

$$e_x = \begin{pmatrix} e_{x,-N} \\ e_{x,-(N-1)} \\ .. \\ e_{x,o} \\ . \\ e_{x,(N-1)} \\ e_{x,N} \end{pmatrix} h_y = \begin{pmatrix} h_{y,-N} \\ h_{y,-(N-1)} \\ .. \\ h_{y,o} \\ . \\ h_{y,(N-1)} \\ h_{y,N} \end{pmatrix} h_z = \begin{pmatrix} h_{z,-N} \\ h_{z,-(N-1)} \\ .. \\ h_{z,o} \\ . \\ h_{z,(N-1)} \\ h_{z,N} \end{pmatrix} \quad (12)$$

and $$E = \begin{pmatrix} \varepsilon_0 & \varepsilon_1 & \cdots & \varepsilon_{-N} \\ \varepsilon_1 & \varepsilon_0 & \cdots & \varepsilon_{-(N-1)} \\ . & & & . \\ . & . & \cdots & . \\ . & & & . \\ \varepsilon_N & \varepsilon_{N-1} & \cdots & \varepsilon_o \end{pmatrix}, \quad (13)$$

$$M = \begin{pmatrix} \mu_0 & \mu_1 & \cdots & \mu_{-N} \\ \mu_1 & \mu_0 & \cdots & \mu_{-(N-1)} \\ . & & & . \\ . & . & \cdots & . \\ . & & & . \\ \mu_N & \mu_{N-1} & \cdots & \mu_o \end{pmatrix},$$

$$M_z = \begin{pmatrix} \mu_{z,0} & \mu_{z,1} & \cdots & \mu_{z,-N} \\ \mu_{z,1} & \mu_0 & \cdots & \mu_{z,-(N-1)} \\ . & & & . \\ . & . & \cdots & . \\ . & & & . \\ \mu_{z,N} & \mu_{z,N-1} & \cdots & \mu_{z,o} \end{pmatrix}$$

Equation 11 is preferably alternately written as:

$$-j\omega\mu_o h_y = A_\mu \frac{\partial e_x}{\partial z}; \quad j\omega\mu_o h_z = A_{\mu_z} \frac{\partial e_x}{\partial y} \quad (14)$$

Where:

$$A_\mu = \begin{bmatrix} a_0 & a_1 & \cdots & a_{-N} \\ a_1 & a_0 & \cdots & a_{-(N-1)} \\ . & & & . \\ . & . & \cdots & . \\ . & & & . \\ a_N & a_{N-1} & \cdots & a_o \end{bmatrix},$$

$$A_{\mu_z} = \begin{bmatrix} a_{z,0} & a_{z,1} & \cdots & a_{z,-N} \\ a_{z,1} & a_{z,0} & \cdots & a_{z,-(N-1)} \\ . & & & . \\ . & . & \cdots & . \\ . & & & . \\ a_{z,N} & a_{z,N-1} & \cdots & a_{z,o} \end{bmatrix}$$

and $$\frac{1}{\mu} = \sum_{n=-N}^{N} a_n e^{-j\frac{2\pi n}{P}y} \frac{1}{\mu_z} = \sum_{n=-N}^{N} a_{z,n} e^{-j\frac{2\pi n}{P}y}$$ (5)

Equations 11 and 14 are self-consistent with respect to their usage of M or $A_{82}$. For the present purposes, the following hybrid is preferably used:

$$h_y = \left(\frac{1}{-j\omega\mu_o}\right) A_\mu \frac{\partial e_x}{\partial z}; \quad h_z = \left(\frac{1}{j\omega\mu_o}\right) M_z^{-1} \frac{\partial e_x}{\partial y}$$ (15)

In general, equation 15 is not self-consistent, since $M^{-1} \neq A_\mu$. However, equation 15 is preferably used in the present method, because it has been determined to have more rapid convergence of the field solutions as the number of field harmonics is increased. Combining equations 5 and 15 yields:

$$-A_\mu^{-1}\left[-\frac{\partial}{\partial y}\left(M_z^{-1}\frac{\partial}{\partial y}\right) - E\right]e_x = -\frac{1}{k_o^2}\frac{\partial^2 e_x}{\partial z^2}$$ (16)

Note that $$\frac{\partial}{\partial y} \to jk_{ym},$$

were the m subscript denotes the $m^{th}$ harmonic.

$$-S^2 e_x = A_\mu^{-1}[K_y M_z^{-1} K_y - E]e_x = \frac{1}{k_o^2}\frac{\partial^2 e_x}{\partial z^2}$$ (17)

For isotropic magnetic permeability, $M^{-1} = M_z^{-1} = A_\mu = I$. Therefore, the TE case is preferably given by:

$$-S^2 e_x = [K_y^2 - E]e_x = \frac{1}{k_o^2}\frac{\partial^2 e_x}{\partial z^2}$$ (18)

The TM case is defined by $(H_x, E_y, E_z) \neq 0$, and where all other field components are zero. The TM case equations are preferably obtained from the TE case equations by duality. Equation 17 thereby yields:

$$-S^2 h_x = A_\varepsilon^{-1}[K_y E_z^{-1} K_y - M]h_x = \frac{1}{k_o^2}\frac{\partial^2 h_x}{\partial z^2}$$ (19)

For isotropic magnetic permeability, $M = A_\mu = I$. Therefore, the TM case is preferably given by:

$$-S^2 h_x = A_\varepsilon^{-1}[K_y E_z^{-1} K_y - I]h_x = \frac{1}{k_o^2}\frac{\partial^2 h_x}{\partial z^2}$$ (20)

Both the TE and the TM differential equations as derived above are preferably summarized as:

$$-S^2 f = \frac{1}{k_o^2}\frac{\partial^2 f}{\partial z^2}; \quad f = \begin{cases} TE: e_x \\ TM: h_x \end{cases}; \quad -S^2 = \begin{cases} TE: A_\mu^{-1}[K_y M_z^{-1} K_y - E] \\ TM: A_\varepsilon^{-1}[K_y E_z^{-1} K_y - M] \end{cases}$$ (21)

By inspection, the complex exponential matrix functions given by $e^{\pm jk_o Sz}$ are solutions to 21, therefore:

$$f = e^{jk_o Sz}d_+ + e^{-jk_o Sz}d_-$$ (22)

Where $d_\pm$ are arbitrary column vector constants.

Using DeMoivre's identity, equation 22 can alternately be expressed as:

$$f = \cos(k_o Sz)d_+ + \sin(k_o Sz)d_-$$ (24)

Figure 2:
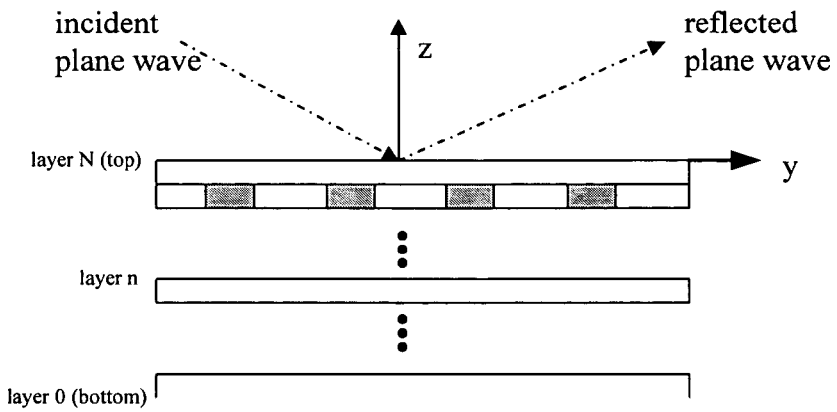
FIG. 2 is a film stack coordinate system depicting a grating layer and additional layers.

Equation 22 can also be alternately expressed as:

$$f = W^{-1} e^{jk_o K_z z} W d_+ + W^{-1} e^{-jk_o K_z z} W d_-$$ (25)

where W=eigenvector matrix and $K_z$=eigenvalue (diagonal) matrix such that $S^2 = WK_z^2 W^{-1}$ Reflectance Update Algorithm With reference now to FIG. 2, this algorithm is created to speed up the computation of multi-modal reflectance through multiple isotropic film layers only. Multi-modal reflectance is defined as the reflectance of multiple propagating plane waves incident at different angles. In the case of a periodic grating structure, for example, these plane waves would be equal to the Floquet harmonics.

TE Case

Consider an expression for the TE electric and magnetic fields in the $n^{th}$ layer ($e_{x,n}$, $h_{y,n}$) given in terms of eigen-matrix $S_n$, magnetic permeability matrix $A_{\mu,n}$, and unknown constants $d_{+,n}$, $d_{-,n}$, as given below.

$$e_{x,n} = e^{jk_o S_n z}d_{+,n} + e^{-jk_o S_n z}d_{-,n}$$ (26)

$$h_{y',n} = -h_{y,n} = A_{\mu,n} S_n (e^{jk_o S_n z}d_{+,n} - e^{-jk_o S_n z}d_{-,n})$$ (27)

where the bold large case letters denote square matrices and the bold small case letters denote a column vector.

Rewriting equations 26 and 27 yields:

$$\begin{bmatrix} e_{x,n} \\ h_{y',n} \end{bmatrix} = P_n K_{z,n} \begin{bmatrix} d_{+,n} \\ d_{-,n} \end{bmatrix}$$ (28)

where $$P_n = \begin{bmatrix} I & I \\ A_{\mu,n} S_n & -A_{\mu,n} S \end{bmatrix}$$ (29)

$$K_{z,n} \begin{bmatrix} e^{jk_o S_n z} & 0 \\ 0 & e^{-jk_o S_n z} \end{bmatrix}$$ (30)

The expression $c_\pm$ is defined in terms of tangential fields at the n and n−1 layer interface, i.e., z=0, as given below.

$$d_{+,n} + d_{-,n} = e_{x,n-1} \quad (31)$$

$$d_{+,n} - d_{-,n} = S_n^{-1} A_{\mu,n}^{-1} h_{y',n-1} \quad (32)$$

$$d_{\pm,n} = \frac{1}{2}(e_{x,n-1} \pm S^{-1} A_{\mu,n}^{-1} h_{y',n-1}) \quad (33)$$

$$\begin{bmatrix} d_{+,n} \\ d_{-,n} \end{bmatrix} = \frac{1}{2}\begin{bmatrix} I & S_n^{-1} A_{\mu,n}^{-1} \\ I & -S_n^{-1} A_{\mu,n}^{-1} \end{bmatrix}\begin{bmatrix} e_{x,n-1} \\ h_{y',n-1} \end{bmatrix} = \frac{1}{2}\begin{bmatrix} I & (A_{\mu,n} S_n)^{-1} \\ I & -(A_{\mu,n} S_n)^{-1} \end{bmatrix}\begin{bmatrix} e_{x,n-1} \\ h_{y',n-1} \end{bmatrix} \quad (34)$$

Equation 34 is rewritten in terms of equation 29 as given below.

$$\begin{bmatrix} d_{+,n} \\ d_{-,n} \end{bmatrix} = P_n^{-1} \begin{bmatrix} e_{x,n-1} \\ h_{y',n-1} \end{bmatrix} \quad (35)$$

where $$P_n^{-1} = \frac{1}{2}\begin{bmatrix} I & (A_{\mu,n} S_n)^{-1} \\ I & -(A_{\mu,n} S_n)^{-1} \end{bmatrix} \quad (36)$$

By substituting equation 35 into equation 28 there is given:

$$\begin{bmatrix} e_{x,n} \\ h_{y',n} \end{bmatrix} = P_n K_{z,n} P_n^{-1} \begin{bmatrix} e_{x,n-1} \\ h_{y',n-1} \end{bmatrix} \quad (37)$$

The recursive nature of equation 33 means that the fields at the top of the $N^{th}$ layer (n=N+1,N interface) can be written in terms of the fields at the top of the bottom film layer (n=1,0 interface), as $$\begin{bmatrix} e_{x,n} \\ h_{y',n} \end{bmatrix} = \quad (38)$$

$$P_N K_{z,N} P_N^{-1} \ldots P_n K_{z,n} P_n^{-1} P_{n-1} K_{z,n-1} P_{n-1}^{-1} \ldots P_1 K_{z,1} P_1^{-1} \begin{bmatrix} e_{x,0} \\ h_{y',0} \end{bmatrix}$$

If the assumption is made that each layer between m and n is isotropic, then $A_{\mu,n} = \mu_n I$, and $S_n$ and $e^{\pm jk_o S_n z}$ are diagonal matrices, and hence, the elements of P, K are all diagonal matrices. It then follows that, $$\begin{bmatrix} e_{x,n} \\ h_{y',n} \end{bmatrix} = \Theta P_n K'_{z,n} P_n^{-1} \ldots P_{m+1} K'_{z,m+1} P_{m+1}^{-1} \begin{bmatrix} e_{x,m} \\ h_{y',m} \end{bmatrix} \quad (39)$$

where $$\Theta = \exp\left(jk_0 \sum_{i=m+1}^{n-1} S_i z_i\right) \quad (40)$$

-continued $$K'_{z,n} = \begin{bmatrix} 1 & 0 \\ 0 & e^{-j2k_o S_n z_n} \end{bmatrix} \quad (41)$$

Define a matrix T, such that $$T_n = 2 P_n K'_{z,n} P_n^{-1} = \begin{bmatrix} I & I \\ \frac{1}{\mu_n} S_n & -\frac{1}{\mu_n} S \end{bmatrix}\begin{bmatrix} 1 & 0 \\ 0 & e^{-j2k_o S_n z} \end{bmatrix}\begin{bmatrix} I & \mu_n S_n^{-1} \\ I & -\mu_n S_n^{-1} \end{bmatrix} \quad (42)$$

$$T_n = 2 P_n K'_{z,n} P_n^{-1} = \begin{bmatrix} I & I \\ \frac{1}{\mu_n} S_n & -\frac{1}{\mu_n} S \end{bmatrix}\begin{bmatrix} I & \mu_n S_n^{-1} \\ e^{-j2k_o S_n z} & -e^{-j2k_o S_n z} \mu_n S_n^{-1} \end{bmatrix} \quad (43)$$

$$T_n = 2 P_n K'_{z,n} P_n^{-1} = \begin{bmatrix} (I + e^{-j2k_o S_n z}) & \mu_n S_n^{-1}(I - e^{-j2k_o S_n z}) \\ \frac{1}{\mu_n} S_n (I - e^{-j2k_o S_n z}) & (I + e^{-j2k_o S_n z}) \end{bmatrix} \quad (44)$$

Substituting equation 44 into equation 39 yields:

$$\begin{bmatrix} e_{x,n} \\ h_{y',n} \end{bmatrix} = \left(\frac{1}{2}\right)^{n-m} \Theta T_n \ldots T_{m+1} \begin{bmatrix} e_{x,m} \\ h_{y',m} \end{bmatrix} \quad (45)$$

Two computing cases are considered: 1) the reflectance at the top layer, such as at the top of the film stack, and 2) the impedance Z at layers between non-isotropic layers, such as gratings.

Reflectance is defined as the ratio of up waves to down waves at the bottom interface of the $n^{th}$ layer, or in other words that n, n−1 layer interface. Applying equation 34 to equation 45 yields:

$$\begin{bmatrix} R_n d_{-,n} \\ d_{-,n} \end{bmatrix} = \begin{bmatrix} d_{+,n} \\ d_{-,n} \end{bmatrix} = \left(\frac{1}{2}\right)^{n-m} \Theta P_n^{-1} T_{n-1} \ldots T_{m+1} \begin{bmatrix} e_{x,m} \\ h_{y',m} \end{bmatrix} \quad (46)$$

At this point, the formulation can be modified in at least two different ways. For example, equation 46 can be written in a recursive form by expressing e and h at the $m^{th}$ layer in terms of reflectance, which would be consistent with the T-matrix or modified T-matrix reflectance algorithm. Second, e and h at the $m^{th}$ layer can be rewritten in terms of impedance. The Z formulation, used for grating computations, is developed in detail below. For the Z matrix formulation:

$$\begin{bmatrix} R_n d_{-,n} \\ d_{-,n} \end{bmatrix} = \left(\frac{1}{2}\right)^{n-m} \Theta T'' \begin{bmatrix} Z_m h_{y',m} \\ h_{y',m} \end{bmatrix} \quad (47)$$

where, for convenience, the definition $T'' = P_n^{-1} T_{n-1} \ldots T_{m+1}$ is made. Writing out the elements of T'' yields:

$$\begin{bmatrix} R_n d_{-,n} \\ d_{-,n} \end{bmatrix} = \left(\frac{1}{2}\right)^{n-m} \Theta \begin{bmatrix} T''_1 & T''_2 \\ T''_3 & T''_4 \end{bmatrix}\begin{bmatrix} Z_m h_{y',m} \\ h_{y',m} \end{bmatrix} = \begin{bmatrix} \Theta(T''_1 Z_m + T''_2)h_{y',m} \\ \Theta(T''_3 Z_m + T''_4)h_{y',m} \end{bmatrix} \quad (48)$$

It follows from equation 48 that:

$$\Theta^{-1}R_n\Theta(T''_3Z_m+T''_4)=(T''_1Z_m+T''_2) \quad 49$$

where $$T'''=P_n^{-1}T_{n-1}\ldots T_{m+1} \quad 50$$

Using properties of the transpose, equation 49 can be rewritten as a linear system of equations that can be computed more efficiently than a matrix inverse, as $$(T''_3Z_m+T''_4)^T(R'_n)^T=(T''_1Z_m+T''_2)^T \quad 49$$

where $R'_n=\Theta^{-1}R_n\Theta$ \quad 49a

Because $\Theta$ is a diagonal matrix, the (p,q) element of R can be computed from the corresponding element in R' and the p, q diagonal element of S, which are the eigenvalues, $$R_{p,q}=R'_{p,q}e^{-jk_oS_pz_n}e^{jk_oS_qz_n} \quad 49b$$

Similarly, an expression can be derived for the impedance at the $n^{th}$ layer in terms of the $m^{th}$ layer impedance. Starting from equation 45:

$$\begin{bmatrix} Z_nh_{y',n} \\ h_{y',n} \end{bmatrix} = \begin{bmatrix} e_{x,n} \\ h_{y',n} \end{bmatrix} = \Theta T'' \begin{bmatrix} Z_mh_{y',m} \\ h_{y',m} \end{bmatrix} \quad 45$$

where, for convenience, the definition is made:

$$T'=T_{n-1}\ldots T_{m+1} \quad 51$$

Following steps similar to those in the derivation of R it is found that:

$$(T'_3Z_m+T'_4)^T(Z'_n)^T=(T'_1Z_m+T'_2)^T \quad 52$$

where $Z'_n=\Theta^{-1}Z_n\Theta$ \quad 49a

Explicit expressions for the (p,q) element of Z are computed from corresponding element of Z'

$$Z_{p,q}=Z'_{p,q}e^{-jk_oS_pz_n}e^{jk_oS_qz_n} \quad 52b$$

TM Case

The TM formulation can be derived from the TE formulation using duality, for example, exchanging $\mu$ with $\in$, and exchanging e with h.

Numerical Stability

Of great practical interest is the numerical stability of the algorithm. This issue arises because of the large positive exponentials $\Theta$ which multiply the pre-multiplication of the right hand sides of 49a and 52a.

In the case of computing the reflectance at the top, such as given by equation 49, numerical stability is currently not believed to be a practical concern. The reason for this is that the primary interest is in the specular reflection located on the matrix diagonal. This means that the effect of $\Theta$ is exactly cancelled by the post-multiplication of $\Theta$. Therefore, application of equation 49 to compute the reflectance at the top of the film stack is as stable and as accurate as the more computationally intensive modified T matrix or Z matrix reflectance update algorithms. Similarly, computation using equation 52 will also be stable whenever $Z_m$ is diagonal.

When $Z_m$ is a full matrix, however, the stability of equation 52 becomes of concern. Although exponentials cancel each other out for the diagonal elements, they clearly will not for the off-diagonal elements, forcing an evaluation of large exponentials and then multiplying them with Z'. This is not necessarily a problem for floating point arithmetic. Problems arise in this case because, as shown below, there is an absolute limit on the smallest accurately computable value of Z' using floating point arithmetic.

To derive an estimate for the smallest computable value of Z', absolute limits on the accuracy of floating point arithmetic are caused by subtraction/addition operations and not multiplications or division. The difference between two very small floating point numbers is unknown if it is smaller than the number of significant digits, whereas the products of two small numbers will have the same number of significant digits.

From equation 44, the smallest value of a T element is governed by the addition of an identity matrix, I, with a diagonal exponential matrix. Since, by design, the magnitude of the exponential matrix element is less than one, the smallest value of T that can be resolved using double precision is between $10^{-15}$ and $10^{-16}$. Because T' is computed as a multiplication of T matrices (which require addition/subtraction of matrix elements), the smallest value of T' that can be accurately computed must also be between $10^{-15}$ and $10^{-16}$.

The smallest number accurately computable in Z', however, is larger than an element of T, or in other words larger than between $10^{-15}$ and $10^{-16}$. This is because of the potential loss of significant digits caused by the linear equation solver. A common rule of thumb estimates the loss of significant digits in the solution of AX=B, where A, B, and X are square matrices, is $\log_{10}(K)$ where K is the condition number of A. In practice, it has been found that the condition number associated with equation 27) is very low, ranging from about one to about one hundred, or in other words, a loss of from about zero to about two significant digits. Therefore, the smallest accurately computable element value in Z' is between $10^{-13}$ to $10^{-16}$.

The aforementioned limit on Z' has a profound effect on the accuracy of Z. In particular, elements of Z will have 13-p to 16-p significant digits whenever elements of Z' are multiplied with exponentials that are of order $10^p$, where $0<p<16$. For $p>16$, clearly this will result in some elements of Z that will be completely incorrect. Fortunately, it can be heuristically argued that the values of these problematic elements can be approximated to be zero, as described in greater detail elsewhere herein. It has been verified that, in practice, for double precision arithmetic a minimum of six to eight digits of accuracy are preserved if any Z' elements that are 1) of order $<10^{-15}$ and 2) calculated by multiplication of exponentials $>10^{p=7}$ are zero'ed out.

Reflectance/Impedance Derivative Computation

Taking the reflectance derivative from 49a $$\partial R_n = \partial[\Theta R'_n\Theta^{-1}] = \Theta\partial R'_n\Theta^{-1} + (\partial\Theta)R'_n\Theta^{-1} - \Theta R'_n\Theta^{-1}(\partial\Theta)\Theta^{-1} \quad 54$$

where $$R'_n=(T''_1Z_m+T''_2)(T''_3Z_m+T''_4)^{-1} \quad 49$$

$$\partial R'_n=[(\partial T''_1Z_m+\partial T''_2+T''_1\partial Z_m)-R'_n(\partial T''_3Z_m+\partial T''_4+T''_3\partial Z_m)](T''_3Z_m+T''_4)^{-1} \quad 55$$

$$\partial R'_n = \underbrace{[(\partial T''_1Z_m + \partial T''_2) - R'_n(\partial T''_3Z_m + \partial T''_4)](T''_3Z_m + T''_4)^{-1}}_{\text{contribution isotropic layers above above mth layers}} + \quad 56$$

$$\underbrace{(T''_1 - R'_nT''_3)\partial Z_m(T''_3Z_m + T''_4)^{-1}}_{\text{contribution of math layers and below}}$$

$$\partial\Theta = j\sum_{i=m+1}^{n-1}\partial(k_oS_iz_i)\Theta$$

Substituting equation 56 into equation 54 yields:

$$\partial R_n = \Theta \partial R'_n \Theta^{-1} + j \sum_{i=m+1}^{n-1} \partial(k_o S_i z_i) R_n - j R_n \sum_{i=m+1}^{n-1} \partial(k_o S_i z_i) \quad 57$$

Similarly, an expression can be derived for the impedance derivative of equation 52.

$$\partial Z_n = \Theta \partial Z'_n \Theta^{-1} + j \sum_{i=m+1}^{n-1} \partial(k_o S_i z_i) Z_n - j Z_n \sum_{i=m+1}^{n-1} \partial(k_o S_i z_i) \quad 58$$

where $$\partial Z'_n = \underbrace{[(\partial T'_1 Z_m + \partial T'_2) - Z'_n(\partial T'_3 Z_m + \partial T'_4)](T'_3 Z_m + T'_4)^{-1}}_{\text{contribution isotropic layers above mth layers}} +$$

$$\underbrace{(T'_1 - Z'_n T'_3) \partial Z_m (T'_3 Z_m + T'_4)^{-1}}_{\text{contribution of math layers and below}}$$

For computational efficiency it is better to represent equations 56 and 59 as a solution to a linear system of equations to avoid computation of a matrix inverse, by:

$$(T''_3 Z_m + T''_4)^T (\partial R'_n)^T = [(\partial T''_1 Z_m + \partial T''_2) - R'_n(\partial T''_3 Z_m + \partial T''_4) + (T''_1 - R'_n T''_3) \partial Z_m]^T \quad 60$$

$$(T'_3 Z_m + T'_4)^T (\partial Z'_n)^T = [(\partial T'_1 Z_m + \partial T'_2) - Z'_n(\partial T'_3 Z_m + \partial T'_4) + (T'_1 - R'_n T'_3) \partial Z_m]^T \quad 61$$

Recalling that S is diagonal for isotropic layers, it is noted that:

diagonal of $\partial R_n$ = diagonal of $\partial R'_n$ \quad 60a diagonal of $\partial Z_n$ = diagonal of $\partial Z'_n$ \quad 60b Justification for Assuming Off-Diagonal Elements of Z Associated with Large Exponentials are Zero Consider a simplified physical interpretation of Z where multiple reflections are ignored. Ignoring multiple reflections is justified by noting that large exponentials will only appear in equation 52 if and only if there is a correspondingly large attenuation. Hence, multiple reflections inside a layer must necessarily be a higher-order effect. This multiple reflection effect is made even smaller by the fact that multiple reflections must decrease geometrically, even when there is no attenuation in the layer, because the reflection coefficient is always less than one. The definition of Z is the ratio of the electric field over the magnetic field. The (p,q) off-diagonal element in the Z, $Z_{p,q}$, can be interpreted to be the conversion ratio at each interface of the magnetic field of the $m^{th}$ Floquet harmonic into the electric field at a different $n^{th}$ Floquet harmonic. Since Z is defined to be at the top of each layer, the electric field at the $n^{th}$ layer can be described in terms of the Z at the (i-1) layer, $Z_{i-1}$ and the magnetic field, by:

$$e_{i,p,x} = Z_{i-1,p,q} h_{i,q,y} e^{-j S_i,p d_i} \quad 61$$

where $S_{i,m}$ is a diagonal element of S corresponding to the $m^{th}$ Floquet harmonic. The sign of is $S_{i,p}$ is chosen to guarantee attenuation as the layer thickness d gets larger.

Figure 3:
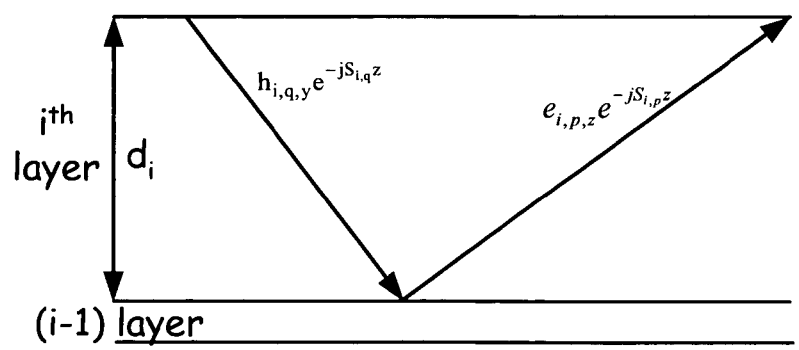
FIG. 3 represents an interface between two layers i and i−1.

With reference now to FIG. 3, an approximate expression for the fields at the top of the ith layer is now written, $h_{i,top}$, $e_{i,top}$. Ignoring multiple reflection yields:

$$e_{i,top} = e_{i,p,x} e^{-j S_i,p d_i} \quad 62$$

$$h_{i,top} = h_{i,n,y} \quad 63$$

Initial inspection of these equations may indicate that an important contribution is missing in the electric field, namely, the first order reflected electric field in the i+1 layer. This term can be ignored because cross reflectance/impedance of different Floquet harmonics, m≠n, are being investigated. Clearly, there can be no impedance coupling between different harmonics at an isotropic layer interface.

Returning to the analysis, equations 61, 62, and 63 are combined to get:

$$Z_{i,p,q} = Z_{i-1,p,q} e^{-j S_i,p d_i} e^{-j S_i,q d_i} \quad 64$$

Consequently, large attenuation in the layer results in exponentially small values in the off-diagonal elements of the impedance matrix. In addition to the obvious dependence on the exponential, the accuracy of approximating equation 64 to be zero depends also on the relative magnitudes of the off-diagonal elements of $Z_{i-1,p,q}$ to its diagonal elements, or in other words, the smaller the off-diagonal elements are relative to its diagonal elements, the better the approximation. If the exponentials that are less than one are defined to be of order magnitude $10^{-p}$, and the ratio of off diagonal elements to diagonal elements to be order $10^r$, where r and p are positive integers, then, approximating equation 4) as zero, (p-r) digits of accuracy are estimated. Intuitively, a minimum of p digits of accuracy are expected since the effect of coupling between Floquet harmonics of different orders will almost certainly be less than the coupling of harmonics of the same order, or in other words, r is less than zero.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of determining actual properties of layered media, the method comprising the steps of:

directing an incident beam of light towards the layered media, such that the incident beam of light is reflected from the layered media as a reflected beam of light, measuring actual properties of the reflected beam of light, estimating properties of the layered media, solving a mathematical model of the layered media with the estimated properties of the layered media to yield theoretical properties of the reflected beam of light, where the mathematical model is solved using a diagonal T matrix algorithm, comparing the theoretical properties of the reflected beam of light to the actual properties of the reflected beam of light to yield a cost function, iteratively adjusting the estimated properties of the layered media and solving the mathematical model until the cost function is within a desired tolerance, and reporting the estimated properties of the layered media as the actual properties of the layered media.

2. The method of claim 1, wherein the method is implemented in an ellipsometer.

3. The method of claim 1, wherein the layered media comprises layers of more than one material.

4. The method of claim 1, wherein the layered media comprises more than one layer.

5. The method of claim 1, wherein the layered media includes a grating layer.

6. The method of claim 1, wherein the actual properties of the layered media include at least one of layer thickness and layer refractive index.

7. The method of claim 1, wherein the mathematical model is a reflectance model that is derived using rigorous coupled wave analysis.

8. The method of claim 1, wherein the diagonal T matrix algorithm is used to compute a reflectance of the layered media.

9. The method of claim 1, wherein the method is implemented in a scatterometer.

10. The method of claim 1, wherein the layered media comprises a film stack on a semiconducting substrate.

11. The method of claim 1, wherein the diagonal T matrix algorithm is used in combination with at least one of an S matrix algorithm and an R matrix algorithm.

12. The method of claim 1, wherein the diagonal T matrix algorithm is characterized by:

$$(T'''_3 Z_m + T'''_4)^T (R'_n)^T = (T'''_1 Z_m + T'''_2)^T$$

where $R'_n = \Theta^{-1} R_n \Theta$.

13. A method of determining a reflectance of a layered media by iteratively solving a mathematical model of the layered media with estimated properties of the layered media, where the mathematical model is solved using a diagonal T matrix algorithm.

14. The method of claim 13, wherein the method is implemented in an ellipsometer.

15. The method of claim 13, wherein the method is implemented in a scatterometer.

16. The method of claim 13, wherein the diagonal T matrix algorithm is characterized by:

$$(T'''_3 Z_m + T'''_4)^T (R''_n)^T = (T'''_1 Z_m + T'''_2)^T$$

where $R'_n = \Theta^{-1} R_n \Theta$.

17. A method of determining actual properties of layered media having more than one layer and layers of more than one material and including a grating layer on a semiconducting substrate, the method comprising the steps of:

directing an incident beam of light towards the layered media, such that the incident beam of light is reflected from the layered media as a reflected beam of light, measuring actual properties of the reflected beam of light, including at least one of layer thickness and layer refractive index, estimating properties of the layered media, solving a mathematical model of the layered media with the estimated properties of the layered media to yield theoretical properties of the reflected beam of light, where the mathematical model is solved using a diagonal T matrix algorithm, wherein the mathematical model is a reflectance model that is derived using rigorous coupled wave analysis, comparing the theoretical properties of the reflected beam of light to the actual properties of the reflected beam of light to yield a cost function, iteratively adjusting the estimated properties of the layered media and solving the mathematical model until the cost function is within a desired tolerance, and reporting the estimated properties of the layered media as the actual properties of the layered media.

18. The method of claim 17, wherein the method is implemented in an ellipsometer.

19. The method of claim 17, wherein the method is implemented in a scatterometer.

20. The method of claim 17, wherein the diagonal T matrix algorithm is characterized by:

$$(T'''_3 Z_m + T'''_4)^T (R'_n)^T = (T'''_1 Z_m + T'''_2)^T$$

where $R'_n = \Theta^{-1} R_n \Theta$.

* * * * *